(12) United States Patent
Bourgeois

(10) Patent No.: US 6,439,107 B1
(45) Date of Patent: *Aug. 27, 2002

(54) GAS FIRED OUTDOOR COOKING APPARATUS

(75) Inventor: Norman R. Bourgeois, Jefferson, LA (US)

(73) Assignee: Metal Fusion, Inc., Jefferson, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/838,091

(22) Filed: Apr. 19, 2001

Related U.S. Application Data

(63) Continuation-in-part of application No. 09/703,993, filed on Nov. 1, 2000, now abandoned, which is a continuation-in-part of application No. 09/567,676, filed on May 9, 2000, now abandoned, which is a continuation-in-part of application No. 09/426,210, filed on Oct. 25, 1999, now Pat. No. 6,058,830, which is a continuation-in-part of application No. 09/149,842, filed on Sep. 8, 1998, now Pat. No. 5,970,852, which is a continuation of application No. 08/813,463, filed on Mar. 10, 1997, now Pat. No. 5,813,321.

(51) Int. Cl.⁷ .......................... A47J 37/00; A47J 37/04; A47J 43/18

(52) U.S. Cl. ............................ 99/340; 99/413; 99/419; 99/426; 99/450; 99/482; 126/30; 126/40

(58) Field of Search .......................... 99/339, 340, 345, 99/426, 403–418, 481, 482, 419–421 V, 444–450; 126/41 R, 25 R, 40, 30, 9 R; 426/523

(56) References Cited

U.S. PATENT DOCUMENTS

| | | |
|---|---|---|
| 3,053,169 A | 9/1962 | Rappaport |
| 3,583,307 A | 6/1971 | Lee, Sr. |
| 4,420,493 A | 12/1983 | Greck et al. |
| 4,450,759 A | 5/1984 | Steibel |
| 4,735,135 A | 4/1988 | Walker |
| 4,945,824 A | 8/1990 | Borgmann |
| 5,065,735 A | 11/1991 | Bourgeois et al. |
| 5,106,642 A | 4/1992 | Ciofalo |
| 5,301,602 A | 4/1994 | Ryezek |
| 5,431,092 A | 7/1995 | Guillory |
| 5,442,999 A | 8/1995 | Meister |
| 5,531,154 A | 7/1996 | Perez, III |

(List continued on next page.)

FOREIGN PATENT DOCUMENTS

| | | |
|---|---|---|
| AT | 2685862 | 7/1993 |
| DE | 217592 | 10/1961 |
| GB | 2205734 A | 12/1988 |

OTHER PUBLICATIONS

King Kooker® Jan. 1, 1996 Brochure, Metal Fusion, Inc.
King Kooker® Jan. 1, 1997 Brochure, Metal Fusion, Inc.
King Kooker® Jan. 1, 1998 Brochure, Metal Fusion, Inc.
King Kooker® Jan. 1, 1999 Brochure, Metal Fusion, Inc.
King Kooker® Jan. 1, 2000 Brochure, Metal Fusion, Inc.
U.S. patent application No. 09/703,993 for "Gas Fired Outdoor Cooking Apparatus," Filed Nov. 1, 2000.

Primary Examiner—Timothy F. Simone
(74) Attorney, Agent, or Firm—Garvey, Smith, Nehrbass & Doody, LLC; Charles C. Garvey, Jr.

(57) ABSTRACT

A cooking apparatus enables a user to cook (boiling, steaming or frying). The apparatus includes a burner having a base that is specially shaped to cradle a pot. An upper section above the support surface of the burner for engaging the sidewall of the pot should the pot be tipped inadvertently. The burner can include upper members that are supported above the bottom of the pot and a lower member that engages an underlying supporting surface. Alternatively, the burner frame can have a plurality of circumferentially spaced radially extending legs. Struts are shaped and cradle the bottom of the pot and its sidewall respectively.

63 Claims, 10 Drawing Sheets

U.S. PATENT DOCUMENTS

| | | |
|---|---|---|
| 5,575,198 A | 11/1996 | Lowery |
| 5,586,489 A | 12/1996 | Fraga |
| 5,662,028 A | 9/1997 | Fraga |
| 5,665,258 A | 9/1997 | Hsu |
| 5,673,611 A | 10/1997 | Tieman |
| 5,758,569 A | 6/1998 | Barbour |
| 5,813,321 A * | 9/1998 | Bourgeois ............ 99/340 |
| 5,896,810 A | 4/1999 | Barbour |
| 5,970,852 A * | 10/1999 | Bourgeois ............ 99/340 |
| 6,058,830 A * | 5/2000 | Bourgeois ............ 99/340 |

* cited by examiner

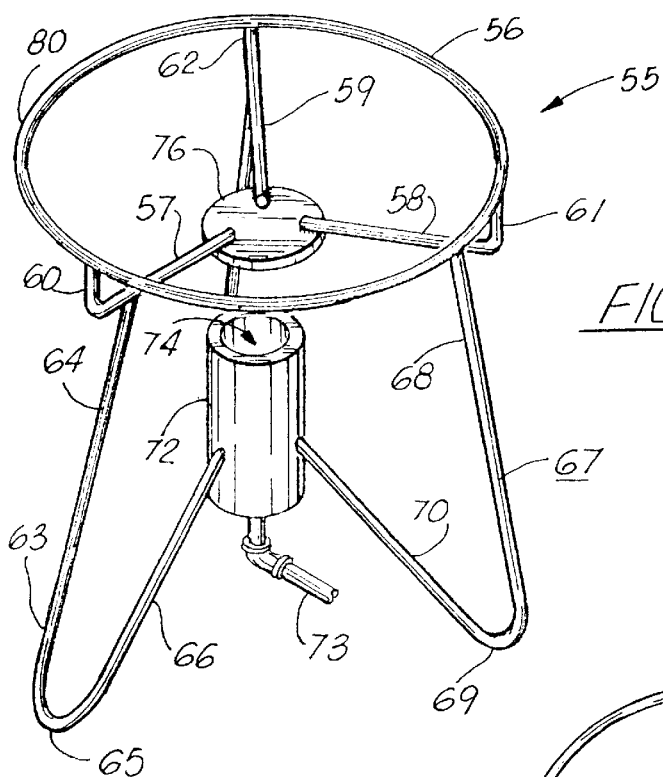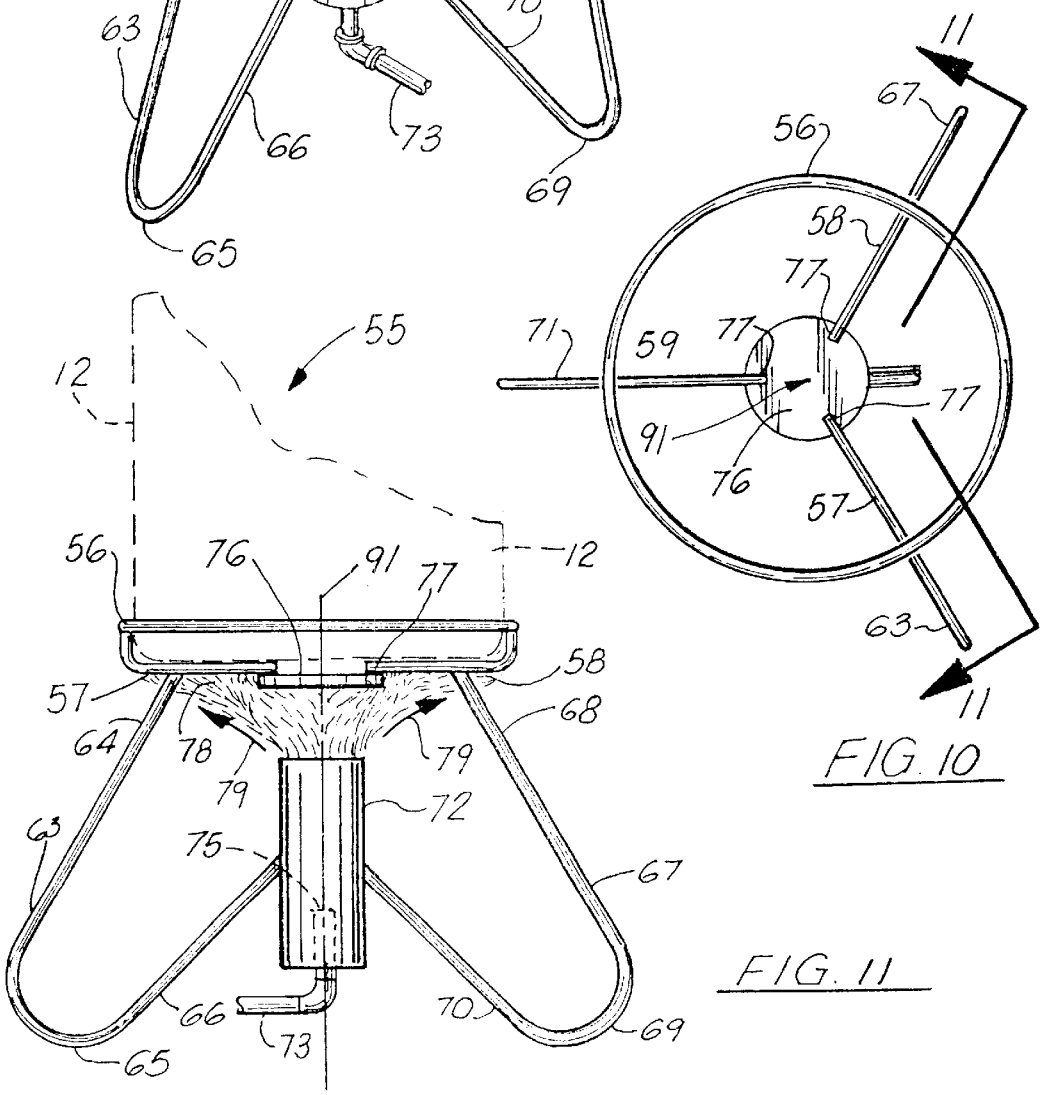

GAS FIRED OUTDOOR COOKING APPARATUS

CROSS-REFERENCE TO RELATED APPLICATIONS

This is a continuation-in-part of U.S. Ser. No. 09/703,993, filed Nov. 1, 2000 now abandoned which is a continuation in part of U.S. Ser. No. 09/567,676, filed May 9, 2000 (now abandoned) which is a continuation in part of U.S. patent application Ser. No. 09/426,210, filed Oct. 25, 1999 (now U.S. Pat. No. 6,058,830), which is a continuation in part of U.S. patent application Ser. No. 09/149,842, filed Sep. 8, 1998 (now U.S. Pat. No. 5,970,852), which is a continuation of U.S. Ser. No. 08/813,463 filed Mar. 10, 1997 (now U.S. Pat. No. 5,813,321).

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices and cooking accessories and more particularly to a natural gas fired outdoor cooker that is supplied with a source of fuel such as butane or propane from a canister and that includes a stand, pot, and pot liner, the improvement including a special configuration of the burner and a connected table that enables a user to quickly support a pot liner or basket upon the table after it is removed from the pot of boiling liquid.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, La. Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include the aforementioned U.S. Pat. Nos. 5,813,321; 5,970,852; and 6,058,830.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

Issued patents to Barbour (U.S. Pat. Nos. 5,758,569 and 5,896,810) disclose a cooking apparatus directed to the frying of poultry items such as turkeys.

An example of a "prior art" smoker arrangement is seen in the 1999 Metal Fusion catalog as Model No. KK495. This arrangement included a propane burner with a flat surface and did not have the improved nested arrangement of the present invention.

One of the problems with outdoor cookers is the handling of very large pots (e.g. 100 quarts) that contain a large number of food items or a bulky item such as a turkey. It is desirable that such an outdoor cooking apparatus have good stability to support the very heavy and often tall pot during cooking, and during placement of or removal of the pot, liner or both from the burner.

BRIEF SUMMARY OF THE INVENTION

The present invention includes a burner frame having a base for engaging an underlying support surface, the burner having a nozzle for generating a high intensity flame for use in cooking, and a supply hose for supplying propane to the burner. The burner frame has a support surface for cradling a pot.

A pot is provided that includes a flat bottom portion and cylindrically-shaped continuous side walls, the pot having a generally cylindrically-shaped interior for receiving a basket. The basket or liner removably fits the pot interior. The basket can include a base that registers against the bottom of the pot and a vertically extending portion adjacent to the pot wall that connects to a bail.

The burner frame includes a ring that is supported above the bottom of the pot on the exterior of the pot for engaging the sidewall of the pot should the pot be tipped.

The upper ring is supported by a plurality of generally "L" shaped struts that extend from the upper ring downwardly along a generally vertical path and then horizontally to cradle the bottom of the pot.

A table removably connects to the burner at the frame. The table extends well above the burner, but below the top of the pot during use. This improved overall geometry is stable, easy to use, and safer than present outdoor cooking devices.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a perspective view of the preferred embodiment of the apparatus of the present invention showing an alternate burner construction;

FIG. 10 is a top view of the burner of FIG. 9;

FIG. 11 is a sectional view taken along lines 11—11 of FIG. 10;

DETAILED DESCRIPTION OF THE INVENTION

Figure 1:
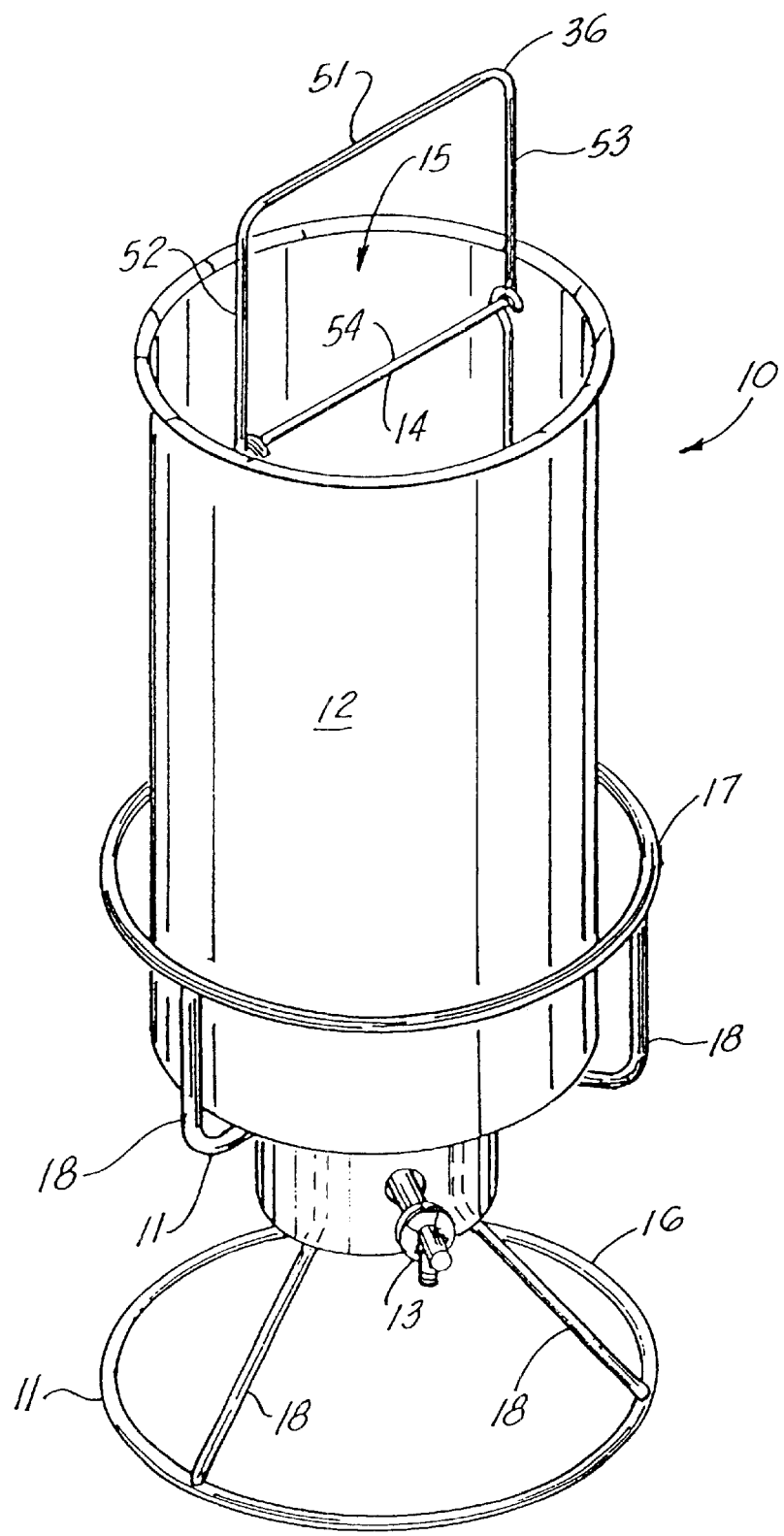
FIG. 1 is a perspective view of the preferred embodiment of the apparatus of the present invention.

The present invention provides an outdoor cooking apparatus designated generally by the numeral 10 in FIG. 1. The apparatus 10 includes a burner 11, pot 12, supply valve 13, a commercially available flexible hose for supplying propane or like fuel for firing the burner 11, and a basket 14 (see FIGS. 2–3) that can be lowered into the interior 15 of pot 12. In FIGS. 4–8, burner 11 includes a lower ring 16 and an upper ring 17. Burner 11 has a nozzle or jet surrounded by cylindrically-shaped wind guard 22.

The rings 16, 17 are connected with a plurality of struts 18. Each strut 18 includes radially extending, inclined lower strut section 19, upper strut section 20, and vertical center strut section 21. Each of the lower strut sections 19 is linear in shape, and inclined to form a connection between the lower or base ring 16 and the bottom of central strut section 21 (see FIG. 6).

Upper strut sections 20 are generally "ell" shaped having a lower end portion 23 that forms a connection with the upper end of central strut section 21 and an upper end 24 that forms a connection with upper ring 17.

The "ell" shaped upper strut sections 20 include upper linear section 24, lower linear section 23, and bend sections 25, 26. This configuration provides both a base for holding the bottom surface 27 of pot 12 and a vertically extending portion that envelopes the lower end of pot sidewall 28.

In a preferred embodiment, the ring 17 can be positioned, for example, about 2–8 inches above the bottom surface 27 of pot 12. Further, the upper ring 17 has an inside diameter indicated as 29 in FIG. 7 that closely approaches the outside diameter 30 of pot 12. A clearance of about ½–1½ inches is provided in between the inside of ring 17 and the outside of pot wall 28 during use.

Figure 2:
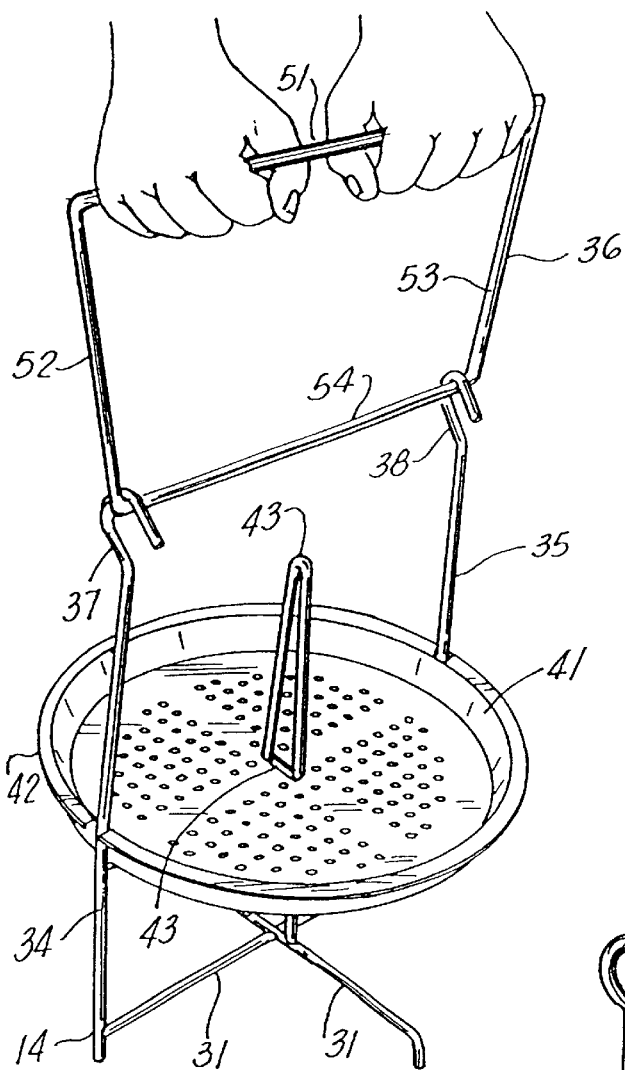
FIG. 2 is a partial perspective view of the preferred embodiment of the apparatus of the present invention illustrating the basket, steam plate, and bail.
Figure 3:
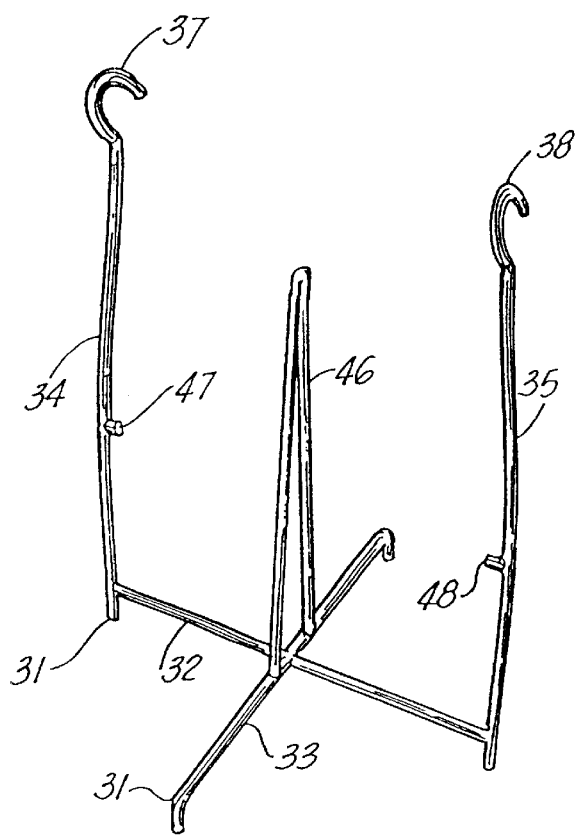
FIG. 3 is a partial perspective of the preferred embodiment of the apparatus of the present invention illustrating the basket portion thereof.
Figure 4:
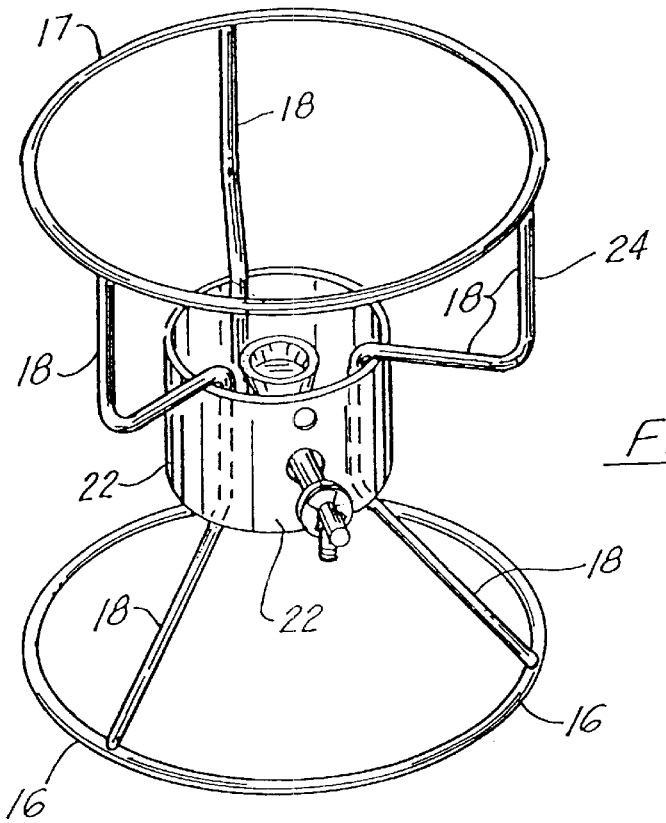
FIG. 4 is a fragmentary perspective view of the preferred embodiment of the apparatus of the present invention illustrating the burner portion thereof.
Figure 5:
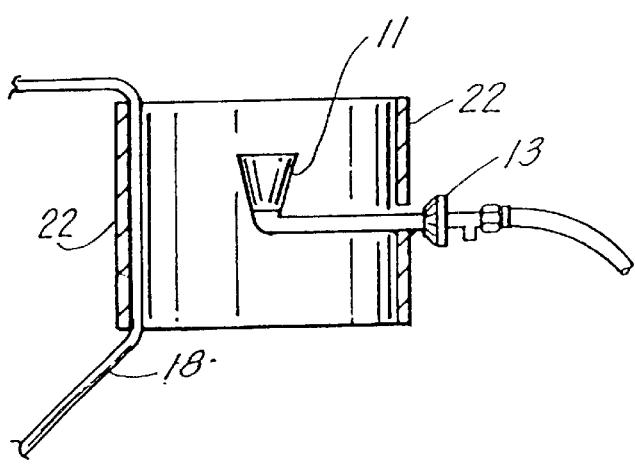
FIG. 5 is a fragmentary sectional elevation view of the burner of FIG. 4.
Figure 6:
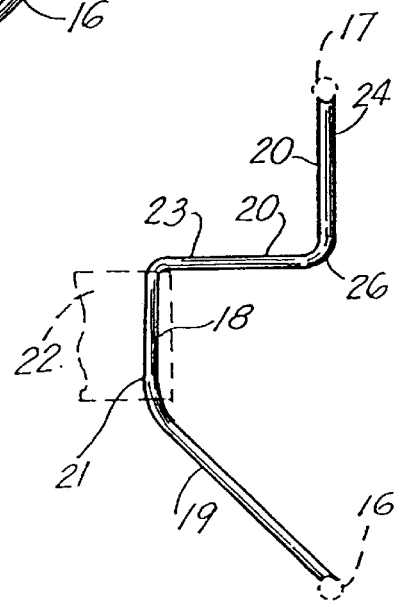
FIG. 6 is a fragmentary sectional elevation view of the burner of FIG. 4.

In FIGS. 1–3, basket 14 includes a wire basket frame base 31 that can be, for example, in the form of a plurality of connected (e.g., welded) wire members arranged in a cross (see FIG. 3).

In FIGS. 2–3, basket 14 includes a base comprised of a pair of linear intersecting members 32, 33, a pair of vertical members 34, 35 and a bail 36. The base can have feet for spacing it from the bottom 27 surface of pot 12. Each vertical member 34, 35 has a hook 37, 38 respectively for connecting to the lower ends 39, 40 of bail 36, as shown in FIG. 2. Bail 36 can be trapezoidal in shape, having handle portion 51, sides 52, 53 and cross beam 54. The enlarged handle 51 enables a user to grip with both hands.

Steamer plate 41 can optionally be placed upon basket 14 if food items are to be steamed. Plate 41 has a generally circular shape, providing peripheral edge 42 and central opening 43. Plate 41 is preferably perforated providing an array of openings therethrough that enable steam to access all surfaces of a food item that is placed on the upper surface 45 of plate 41. Drippings from food items can flow through the openings as well.

Figure 7:
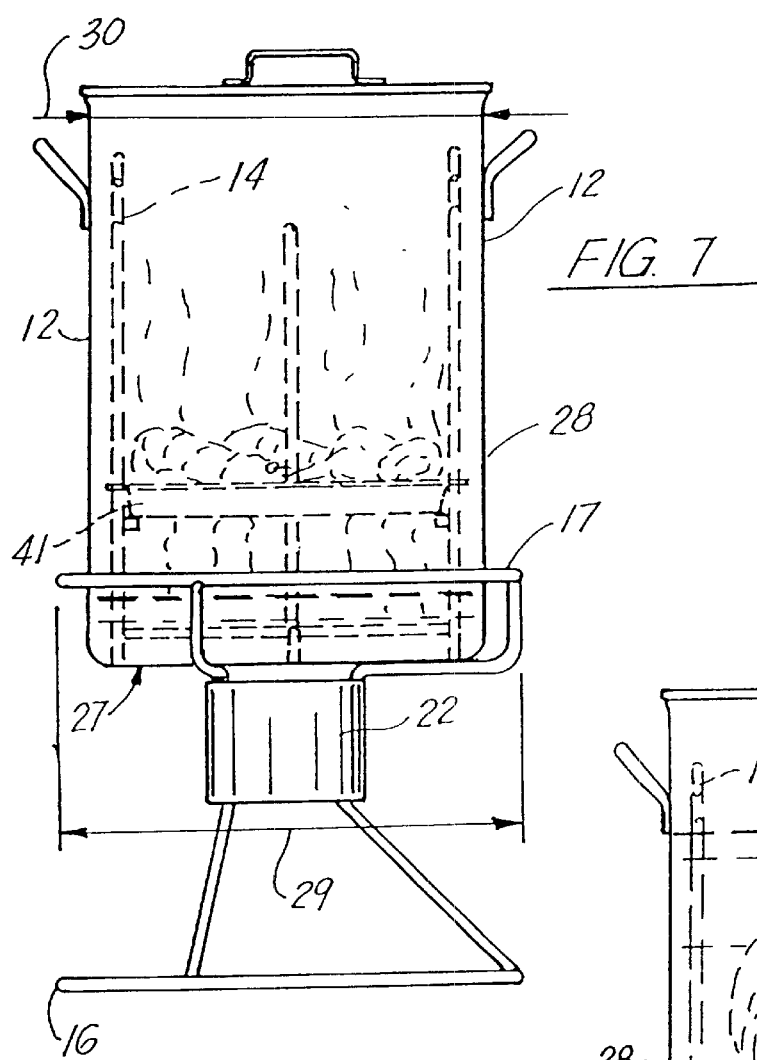
FIG. 7 is a sectional elevation view of the preferred embodiment of the apparatus of the present invention illustrating the burner, pot, and basket portions thereof during steaming.
Figure 8:
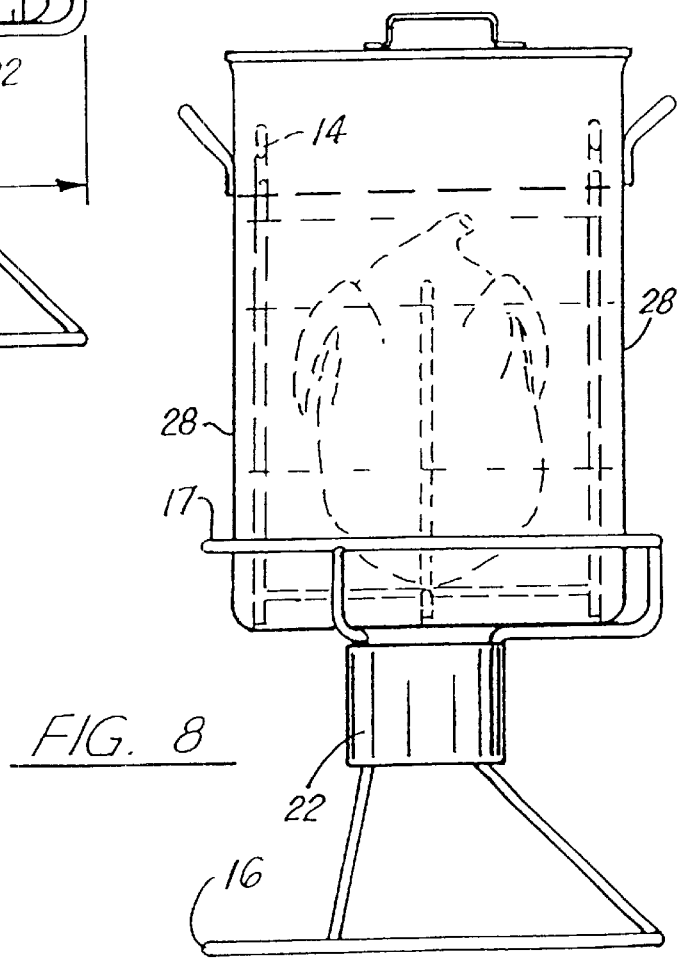
FIG. 8 is a sectional elevation view of the preferred embodiment of the apparatus of the present invention illustrating the burner, pot, and basket portions thereof during boiling.

Support 46 extends upwardly from base 31 of basket 14. Support 46 has a dual function of holding steamer plate 41 as shown in FIGS. 2 and 7 and of supporting a food item such as chicken, turkey or other selected item as shown in FIG. 8.

A pair of laterally extending posts 47, 48 support the peripheral edge 42 of steamer plate 41 when the steamer plate is assembled to the basket 14. Central opening 43 of steamer plate 41 rests upon support 46 when the steamer plate is put in an operational position. The steamer plate is thus supported at its periphery with posts 47, 48 and at its center with support 46. Steamer plate 41 has peripheral slots at 49, 50 that fit vertical members 34, 35 respectively.

The apparatus of the present invention thus provides a dual function cooking apparatus that enables a user to either steam food products such as crabs, lobsters, clams and the like, or boil food items such as fish, shellfish, or poultry items.

Figure 12:
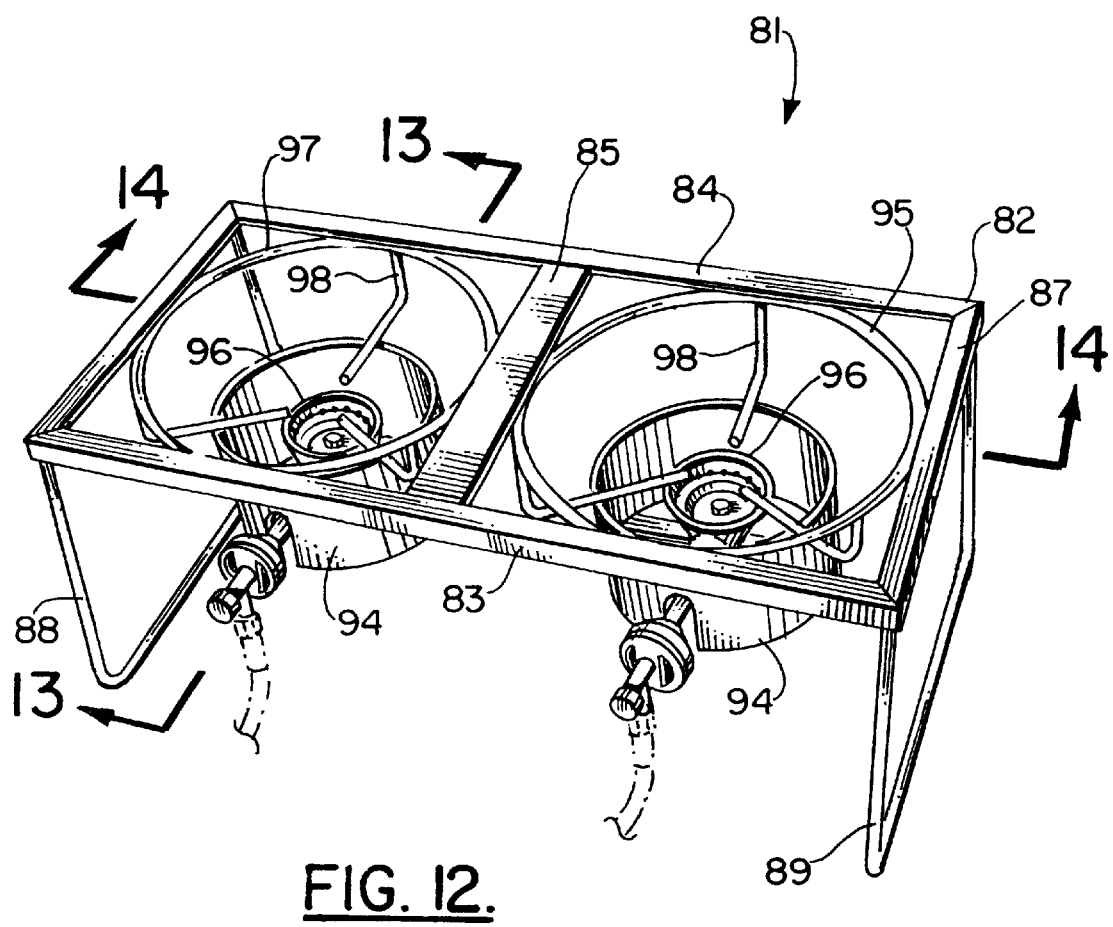
FIG. 12 is a perspective view of an alternate embodiment of the apparatus of the present invention.
Figure 17:
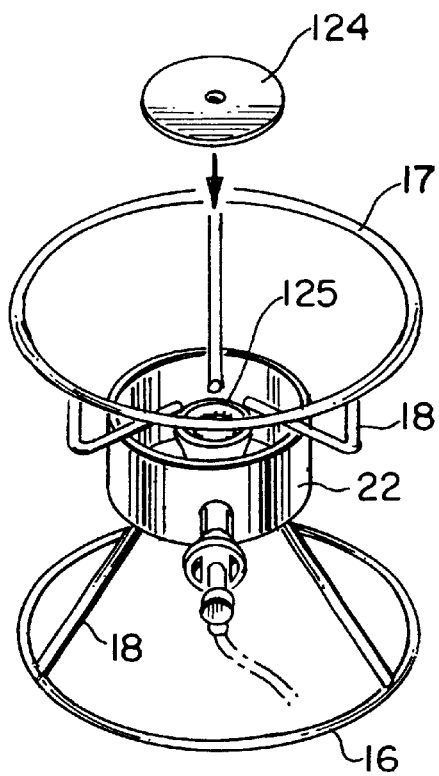
FIG. 17 is a partial perspective view of the third embodiment of the apparatus of the present invention.
Figure 18:
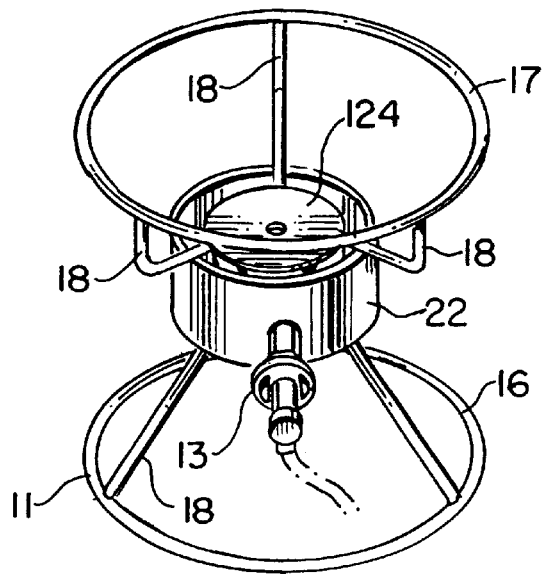
FIG. 18 is another partial perspective view of the preferred embodiment of the apparatus of the present invention.

FIGS. 9–11 show an alternate embodiment of the apparatus of the present invention designated generally by the numeral 55 in FIGS. 12 and 17–18.

Outdoor cooking apparatus 55 includes a burner for supporting pot 12. Burner 55 (FIGS. 9–11) includes upper ring 56 and a plurality of horizontal struts 57–59. Vertical struts 60–62 are connected integrally to horizontal struts 57–59 respectively. As shown in FIGS. 9–11, a plurality of legs 63, 67, 71 are attached to horizontal struts 57, 58, 59 respectively. Each leg 63, 67, 71 is formed of a pair of straight sections and a bend section. The leg 63 includes straight sections 64 and 66 connected by bend 65. The leg 67 includes straight sections 68, 70 connected by bend 69. The leg 71 is similarly configured to legs 63 and 67.

A cylindrical flue 72 is placed at the vertical central axis 91 of burner 55 as shown in FIGS. 10 and 11. The cylindrical flue 72 attaches to each of the legs 63, 67, 71 by welding for example. Each leg 63, 67, 71 attaches to a horizontal strut 57, 58, 62, preferably by welding. Each of the vertical struts 60, 61, 62 attaches to upper end 56 by welding, for example. A fuel supply line 73 is used to supply combustible gas such as propane or butane to nozzle 75. The nozzle 75 is preferably attached to the vertical bore 74 of cylindrical flue 72 by welding or like means known in the art.

Circular plate 76 is attached to the inner end portions of horizontal struts 57, 58, 59 as shown in FIGS. 9–11. This attachment of plate 76 to horizontal struts 57, 58, 59 can be by welding at welds 77 for example.

In FIG. 11, the apparatus 55 of the present invention is shown in operating position wherein pot 12 occupies a position on top of the horizontal struts 57, 58, 59. A flame 78 extends upwardly from nozzle 75. The nozzle 75 can be ignited when propane, butane or like gas is transmitted to the nozzle 75 via pipe line 73 using a match, or like starter. Flame 78 strikes the bottom of plate 76 diverting flame 78 laterally to provide even distribution of heat to the bottom of pot 12. This distribution of the flame 78 outwardly and laterally away from plate 76 is indicated schematically by arrows 79 in FIG. 11.

Figure 13:
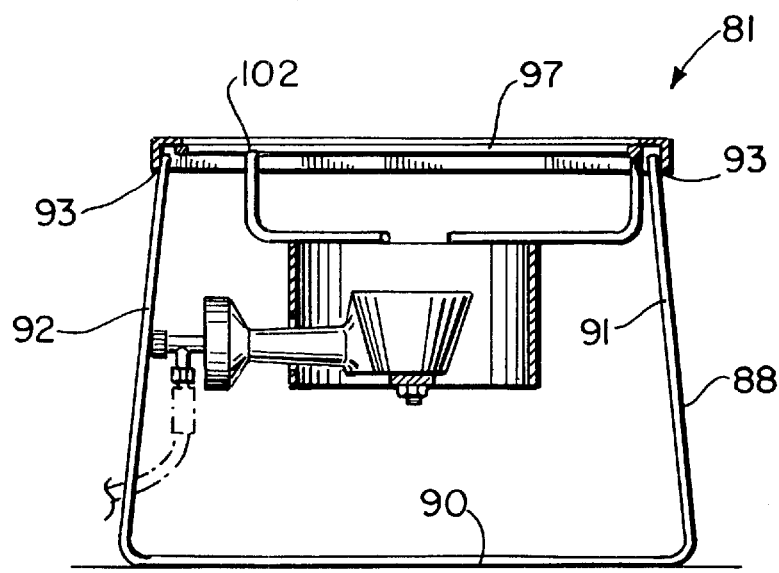
FIG. 13 is a sectional view taken along lines 13—13 of FIG. 12.
Figure 14:
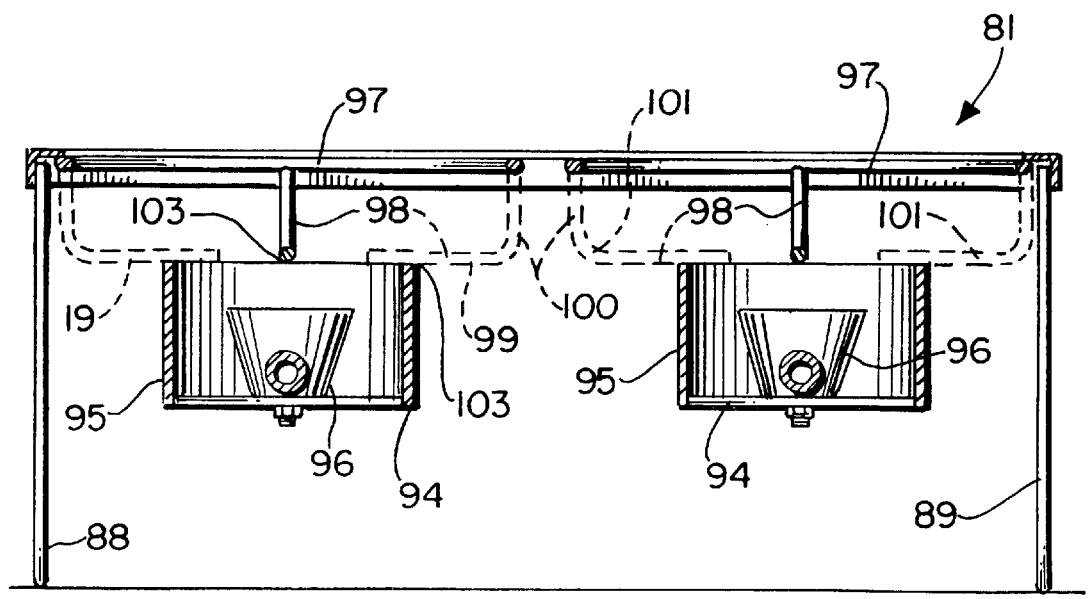
FIG. 14 is a sectional view taken along lines 14—14 of FIG. 12.

FIGS. 12–14 show an alternate embodiment of the apparatus of the present invention designated generally by the numeral 81 in FIGS. 12–14. Burner apparatus 81 includes a frame 82 comprised of a plurality of beams. Frame 82 can be of welded steel construction, for example. Frame 82 thus includes beams 83, 84 that are parallel to each other and central beam 85 that is generally perpendicular to the beams 83, 84.

At the extreme end portions of frame 82, beams 86, 87 extend between respective end portions of beams 83, 84 as shown in FIG. 12. Each of these end beams 86, 87 is connected to a leg 88 or 89. As shown in FIG. 13, attachments 93 (for example, welded attachments) form a connection between each leg 88, 89 and frame 82 at beams 86, 87 respectively.

In FIGS. 13 and 14, each leg 88, 89 is comprised of a horizontal member 90 and a pair of inclined members 91, 92.

In the embodiment of FIGS. 12–14, a pair of burners 94 are provided, each comprising a cylindrically shaped shroud 95, a contained burner element 96 positioned within the shroud 95 as shown in FIGS. 13 and 14 and grate members 98 that support shroud 95 and its contained burner element 96. A ring 97 forms an interface between frame 82 and the plurality of grate members 98. Rings 97 can be welded to the beams at the top of frame 82. In FIG. 12, ring 97 on the left hand side of FIG. 12 is welded to beams 83, 84, 85 and 86. The ring 95 on the right hand side of FIG. 12 is welded to beams 83, 84, 85, and 87. Grate members 98 are welded to ring 97 at attachments 102. Grate members 98 are also connected at attachments 103 to shroud 95. The attachments 103 can be welded connections, for example.

Figure 15:
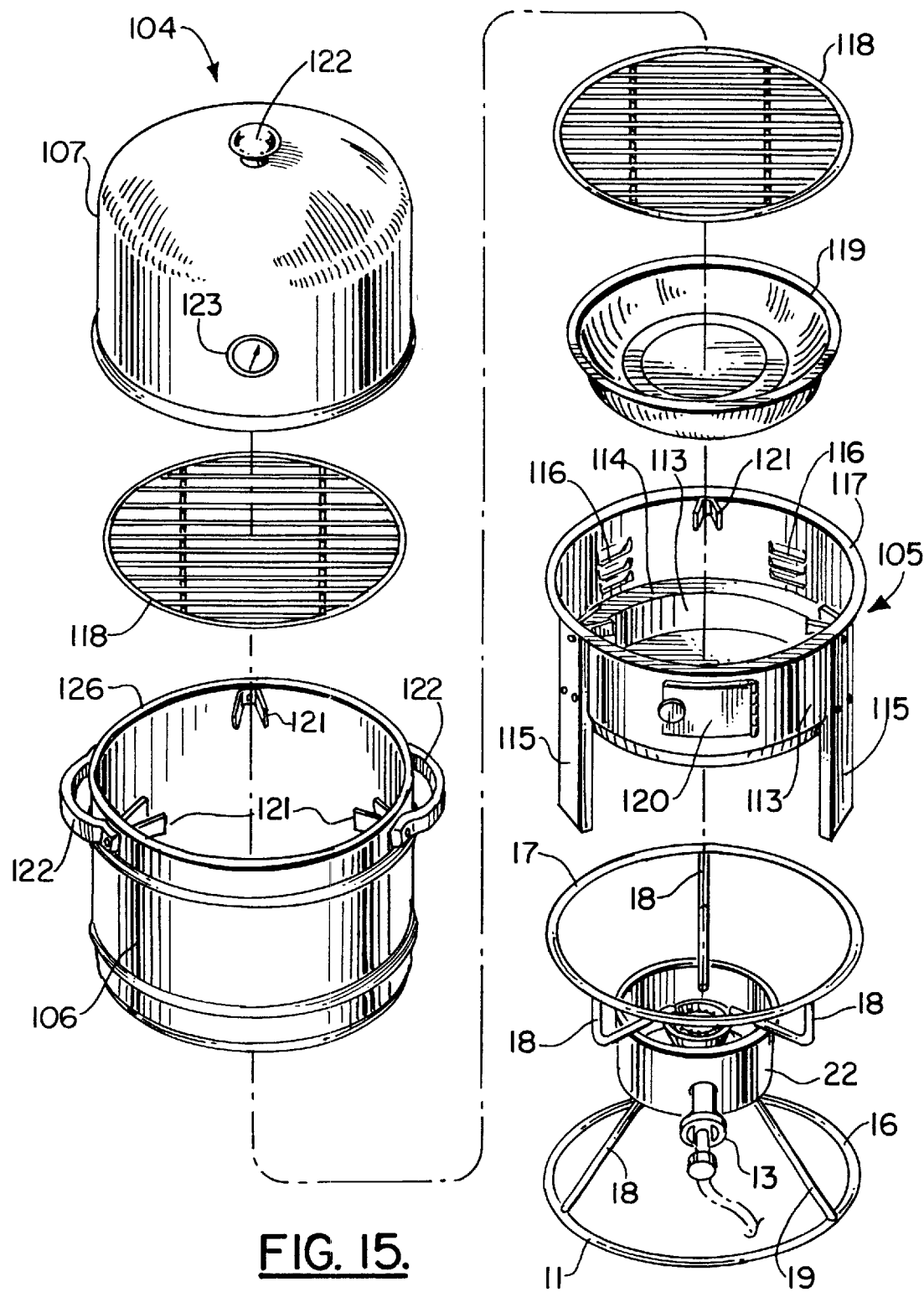
FIG. 15 is an exploded perspective view of a third embodiment of the apparatus of the present invention.
Figure 16:
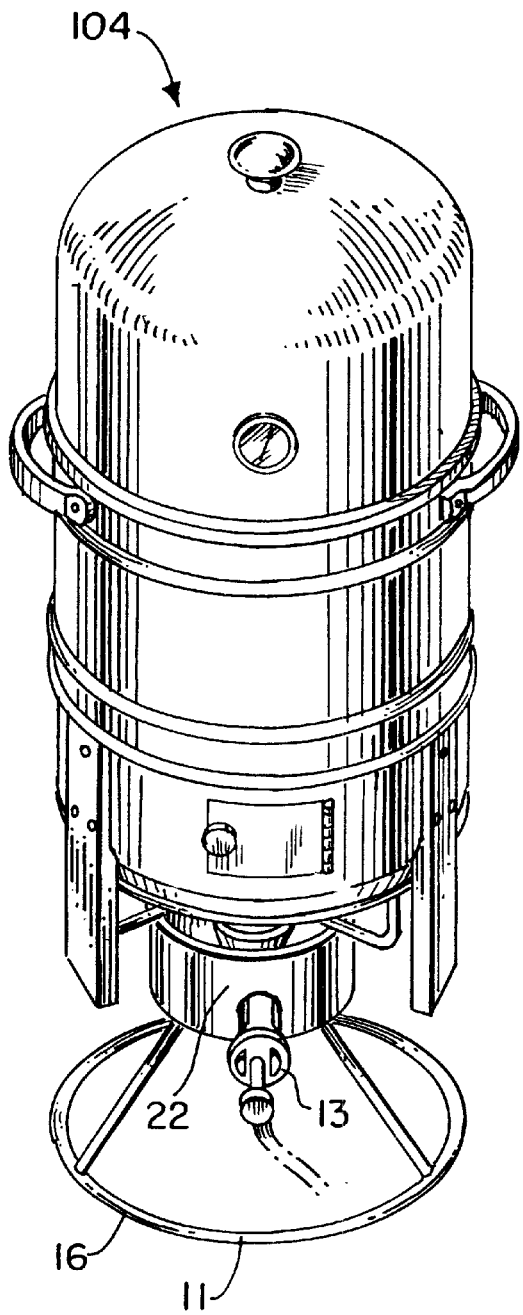
FIG. 16 is a perspective view of the third embodiment of the apparatus of the present invention.

FIGS. 15–20 show a third embodiment of the apparatus of the present invention, designated generally by the numeral 104 in FIGS. 15 and 16. Cooking apparatus 104 is in the form of a combination smoker/burner. This apparatus enables a smoker to be used with the burner that is shown and described with respect to the first and second embodiments of FIGS. 1–14. Smoker apparatus 104 provides a lower section 105, middle section 106, and upper section 107. The upper section 107 basically functions as a cover. The middle section 106 is a cooking chamber. The lower section 105 can be used to contain a bowl that has a liquid that can include seasoning. Alternatively, the sections 105, 106, 107 can be assembled as a free standing smoker separate from burner 11 wherein the bowl 119 can be filled with charcoal.

Figure 19:
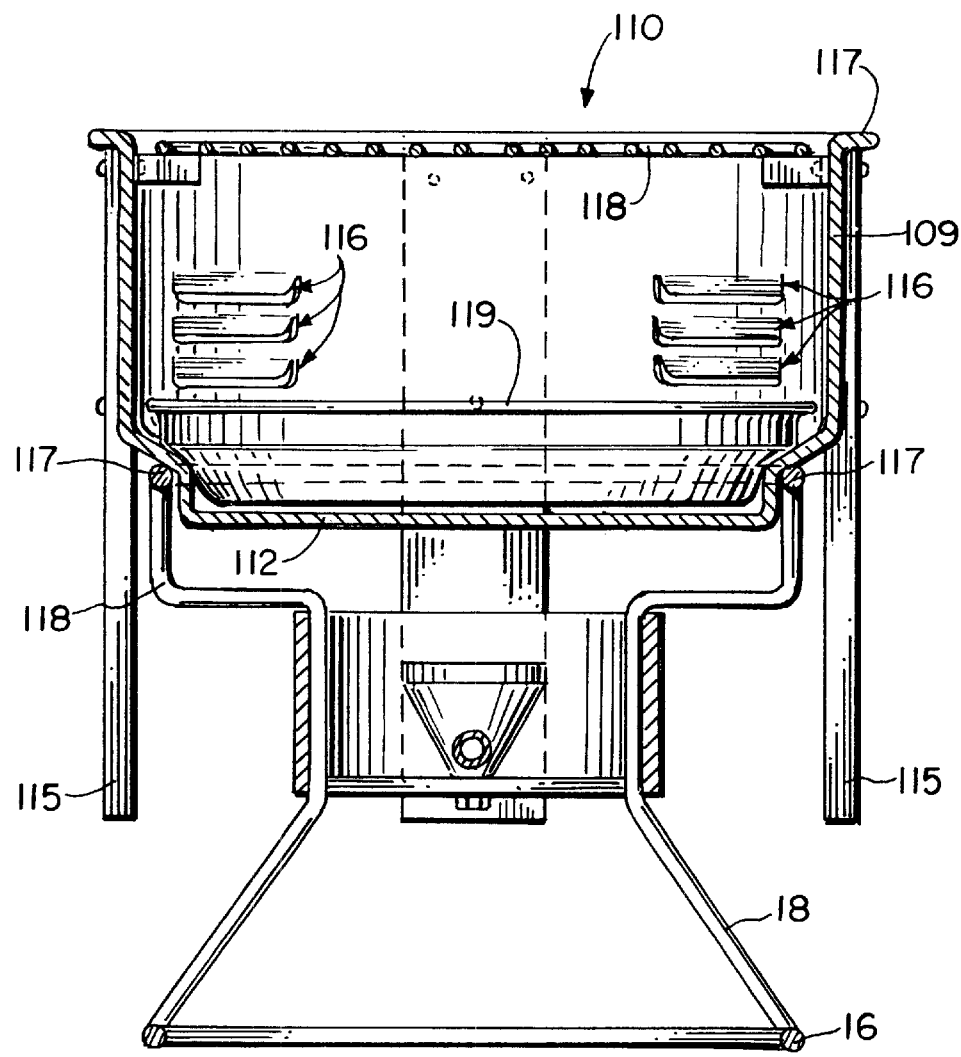
FIG. 19 is a partial sectional elevation view of the third embodiment of the apparatus of the present invention.
Figure 20:
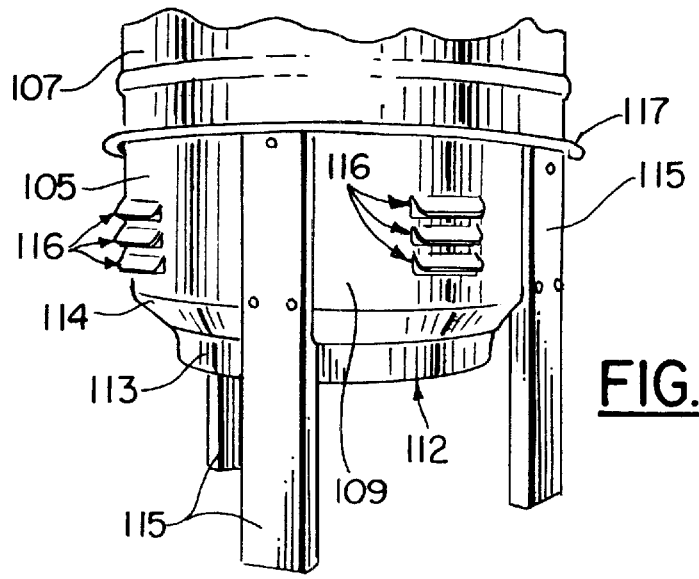
FIG. 20 is a partial perspective view of the third embodiment of the apparatus of the present invention.

Lower section 105 is specially configured to mate with and be supported by burner 11. The lower section 105 provides a larger cylindrical side wall 109 and a smaller cylindrical side wall 113. A tapered annular wall 114 joins the larger cylindrical side wall 109 and the smaller cylindrical side wall 113 as shown in FIG. 19. A bottom panel 112 connects to the lower end of the smaller cylindrical side wall 113. When not in use upon burner 11, the smoker sections 105, 106, 107 can be supported by any means known in the art such as for example, a plurality of legs 115 or a separate base that is not a burner and that fits the contours of bottom 112, small side wall 113, tapered annular side wall 114, and/or larger cylindrical side wall 109.

An access door 120 can be provided in lower section 105 as can be air vent openings 116. The lower section 105 can provide a flat, annular flange 117 or other suitable mating surface for supporting middle section 106. Similarly, upper section 107 is configured to fit upon the upper edge 126 of middle section 106.

A cooking grate 118 can be supported upon one or more supports 121 provided on the interior of lower section 105. Similarly, a plurality of supports 121 can also be provided at the upper end portion of middle section 106 for supporting a cooking grate. Handles 122 can be provided on any of the sections 105, 106, 107 as desired for manipulating the various sections. The cover can be provided with usual thermometer and burner 11 can provide a jet or nozzle 125 and/or a flame diffuser 124.

It should be understood that the general concept of a smoker that includes multiple sections such as 105, 106, 107 is old in the art, having been sold commercially a number of years such by Brinkman and others.

PARTS LIST

The following is a list of suitable parts and materials for the various elements of the preferred embodiment of the present invention.

| Part Number | Description |
| --- | --- |
| 10 | cooking apparatus |
| 11 | burner |
| 12 | pot |
| 13 | supply valve |
| 14 | basket |
| 15 | interior |
| 16 | lower ring |
| 17 | upper ring |
| 18 | strut |
| 19 | lower strut section |
| 20 | upper strut section |
| 21 | center strut section |
| 22 | wind guard |
| 23 | lower linear section |
| 24 | upper linear section |
| 25 | bend |
| 26 | bend |
| 27 | bottom surface |
| 28 | pot sidewall |
| 29 | inside diameter |
| 30 | outside diameter |
| 31 | base |
| 32 | intersecting member |
| 33 | intersecting member |
| 34 | vertical member |
| 35 | vertical member |
| 36 | bail |
| 37 | hook |
| 38 | hook |
| 39 | end |
| 40 | end |
| 41 | steamer plate |
| 42 | peripheral edge |
| 43 | central opening |
| 44 | openings |
| 45 | upper surface |
| 46 | support |
| 47 | horizontal post |
| 48 | horizontal post |
| 49 | slot |
| 50 | slot |
| 51 | handle portion |
| 52 | side |
| 53 | side |
| 54 | transverse beam |
| 55 | outdoor cooking apparatus |
| 56 | upper ring |
| 57 | horizontal strut |
| 58 | horizontal strut |
| 59 | horizontal strut |
| 60 | vertical strut |
| 61 | vertical strut |
| 62 | vertical strut |
| 63 | leg |
| 64 | straight section |
| 65 | bend |
| 66 | straight section |
| 67 | leg |
| 68 | straight section |
| 69 | bend |
| 70 | straight section |
| 71 | leg |
| 72 | cylindrical flue |
| 73 | fuel supply line |
| 74 | vertical bore |
| 75 | nozzle |
| 76 | circular plate |
| 77 | weld |
| 78 | flame |
| 79 | arrows |
| 80 | central axis |
| 81 | burner apparatus |
| 82 | frame |
| 83 | beam |
| 84 | beam |
| 85 | beam |
| 86 | beam |
| 87 | beam |
| 88 | leg |
| 89 | leg |
| 90 | horizontal member |
| 91 | inclined member |
| 92 | inclined member |
| 93 | attachment |
| 94 | burner |
| 95 | shroud |
| 96 | burner element |
| 97 | ring |
| 98 | grate member |
| 99 | horizontal section |
| 100 | vertical section |
| 101 | bend |
| 102 | attachment |
| 103 | attachment |
| 104 | smoker apparatus |
| 105 | lower section |
| 106 | middle section |
| 107 | upper section |
| 109 | cylindrical sidewall |
| 110 | open top |
| 112 | bottom panel |
| 113 | cylindrical sidewall |
| 114 | tapered annular wall |
| 115 | leg |
| 116 | air vent opening |
| 117 | annular flange |
| 118 | cooking grate |
| 119 | bowl |
| 120 | door |
| 121 | support |
| 122 | handle |
| 123 | thermometer |
| 124 | flame diffuser |
| 125 | nozzle |
| 126 | upper edge |

The foregoing embodiments are presented by way of example only; the scope of the present invention is to be limited only by the following claims.

What is claimed is:

1. A cooking apparatus, comprising:
   a) a burner having a frame that includes a base for engaging an underlying support surface, the frame having a burner element for generating a high intensity flame for use in cooking, a supply hose for supplying propane to the burner element, the burner frame having a support surface for cradling a pot;
   b) a pot that includes a generally flat bottom portion and a generally cylindrically shaped continuous sidewall, the pot having a generally cylindrically shaped interior;
   c) the frame including a plurality of at least three struts, each strut including a second strut portion, a second strut portion and a third strut portion, the second strut portion of each strut being generally parallel with the bottom portion of the pot, the second strut portion of each strut extending in a generally vertical direction from the second strut portion, the third strut portion extending downwardly from the second strut portion;
   d) at least a portion of each of the first strut portions extending underneath the bottom portion of the pot when the pot is placed on the frame; and
   e) the second strut portions restricting a range of lateral pot movement during use of the cooking apparatus such as when a food to be cooked is inserted into or removed from the pot.

2. The cooking apparatus of claim 1, further comprising a ring attached to the second strut portion for each of the plurality of generally "ell" shaped struts.

3. The cooking apparatus of claim 1 wherein the base is a circular ring portion of the frame.

4. The cooking apparatus of claim 1 wherein there are at least three circumferentially spaced apart radially extending struts that are spaced about 120 degrees apart.

5. The cooking apparatus of claim 1 further comprising a food holder that fits inside the pot interior, the food holder having a base portion that registers against the bottom of the pot and a vertically extending portion that enables a user to lift the food holder.

6. The cooking apparatus of claim 5 further comprising a horizontally extending portion that is connectable to the food holder and that is sufficiently wide that a user can grip the horizontally extended section with two hands.

7. The cooking apparatus of claim 6 wherein the horizontally extended section is between about seven and fourteen inches (7"–14") in length.

8. The cooking apparatus of claim 1 further comprising a multi-section smoker supported by the frame, the multi-section smoker including a lower smoker section having a recess that fits the strut portions of the frame.

9. A cooking apparatus, comprising:
   a) a burner having a frame that includes a base for engaging an underlying support surface, the frame having a burner element for generating a high intensity flame for use in cooking, a supply hose for supplying propane to the burner element, the burner frame having a support surface for cradling a pot;
   b) a pot that includes a generally flat bottom portion and a generally cylindrically shaped continuous sidewall, the pot having a generally cylindrically shaped interior;
   c) a food holder that fits inside the pot, the liner having a lower end portion for holding foot and an upper end portion that enables a user to grip and lift or lower the food holder;
   d) the frame including a plurality of struts, each strut comprising a first strut portion, a second strut portion and a third strut portion, the first strut portion of each strut being generally parallel with the bottom portion of the pot, the second strut portion of each strut generally tracking upwardly along the sidewall of the pot, the third strut portion including an inclined portion and comprising at least in part the base;
   e) at least a portion of at least one of the first strut portions extending underneath the bottom portion of the pot when the pot is placed on the frame; and
   f) the second strut portions restricting a range of lateral pot movement during use of the cooking apparatus such as when the food holder is inserted into or removed from the pot.

10. The cooking apparatus of claim 9, further comprising a ring attached to the third strut portion to define at least in part the base.

11. The cooking apparatus of claim 9 wherein the base is a circular ring portion of the frame.

12. The cooking apparatus of claim 9 wherein there are at least three circumferentially spaced apart struts.

13. The cooking apparatus of claim 9 further comprising a horizontally extending portion that is connectable to the food holder and that is sufficiently wide that a user can grip the horizontally extended section with two hands.

14. The cooking apparatus of claim 3 wherein the horizontally extending portion removably connects to the lower end portion of the food holder.

15. The cooking apparatus of claim 9 wherein the horizontally extended section is between about seven and fourteen inches (7"–14") in length.

16. A cooking apparatus, comprising:
   a) a burner having a frame that includes a base for engaging an underlying support surface, the frame having a burner element for generating a high intensity flame for use in cooking, a supply hose for supplying propane to the burner element, the burner frame having a support surface for cradling a pot;
   b) a pot that includes a generally flat bottom portion and a generally cylindrically shaped continuous sidewall, the pot having a generally cylindrically shaped interior;
   c) the frame further including a plurality of struts, each strut comprising a first strut portion and a second strut portion, the first strut portion of each strut being generally parallel with the bottom portion of the pot;
   d) at least a portion of the first strut portions extending underneath the bottom portion of the pot when the pot is placed on the frame;
   e) each strut further including a second strut portion with an upper end spaced vertically above the bottom of the pot and closely positioned generally parallel to the sidewall of the pot during use; and
   f) the upper end of each second strut portion restricting a range of lateral pot movement during use of the cooking apparatus such as when a liner is inserted or removed from the pot.

17. The cooking apparatus of claim 16, further comprising a ring attached to the second strut portion for each of the plurality of struts.

18. The cooking apparatus of claim 17 wherein the frame includes a second ring that is connected to each of the struts.

19. The cooking apparatus of claim 16 wherein there are at least three circumferentially spaced apart struts.

20. The cooking apparatus of claim 16 further comprising a food holder that fits inside the pot interior, the food holder having a base that registers against the bottom of the pot and a vertically extending portion that enables a user to lift the food holder.

21. The cooking apparatus of claim 20 further comprising a horizontally extending portion that is connectable to the food holder and that is sufficiently wide that a user can grip the horizontally extended section with two hands.

22. The cooking apparatus of claim 21 wherein the horizontally extended section is between about seven and fourteen inches (7"–14") in length.

23. The cooking apparatus of claim 17 further comprising a multi-section smoker supported by the frame, the multi-section smoker including a lower smoker section having a recess that fits the strut portions of the frame.

24. A cooking apparatus, comprising:
   a) a burner having a frame that includes a base for engaging an underlying support surface, the frame having a burner element for generating a high intensity flame for use in cooking, a supply hose for supplying propane to the burner element, the burner frame having a support surface for cradling a pot;
   b) a pot that includes a generally flat bottom portion and a generally cylindrically shaped continuous sidewall, the pot having a generally cylindrically shaped interior;
   c) the frame including a plurality of generally "ell" shaped struts that include first and second strut portions that are closely positioned to the sidewall and bottom of the pot, the first strut portion extending along a generally vertical path and the second strut portion extending horizontally to provide a horizontal surface that can cradle the bottom of the pot; and
   d) wherein the ell shaped struts forming a lateral restraint to the pot for preventing tilting or lateral movement of the pot such as when the liner is inserted into or removed from the pot.

25. The cooking apparatus of claim 24 wherein the base is a circular ring portion of the frame.

26. The cooking apparatus of claim 24 wherein the burner frame includes an upper ring, a lower ring and a plurality of struts connecting the upper and lower rings, each strut including an inclined section.

27. The cooking apparatus of claim 24 wherein the burner frame includes an upper ring, a lower ring and a plurality of struts connecting the upper and lower rings, each strut including said first and second strut portions.

28. The cooking apparatus of claim 24 wherein the burner frame includes an upper ring, a lower ring and a plurality of struts connecting the said rings, each strut including said horizontal strut portion and said vertical strut portion.

29. The cooking apparatus of claim 27 wherein there are at least three circumferentially spaced apart struts.

30. The cooking apparatus of claim 24 further comprising a food holder that fits inside the pot interior, the food holder having a base the registers against the bottom of the pot and a vertically extending portion that enables a user to lift the food holder.

31. The cooking apparatus of claim 30 further comprising a horizontally extending portion that is connectable to the food holder and that is sufficiently wide that a user can grip the horizontally extended section with two hands.

32. The cooking apparatus of claim 24 wherein the horizontally extended section is between about seven and fourteen inches (7"–14") in length.

33. The cooking apparatus of claim 32 further comprising a multi-section smoker supported by the frame, the multi-section smoker including a lower smoker section having a recess that fits the strut portions of the frame.

34. A cooking apparatus, comprising:
   a) a burner having a frame that includes a base for engaging an underlying support surface, the frame having a burner element for generating a high intensity flame for use in cooking, the burner frame having a support surface for cradling a pot;
   b) a pot that includes a generally flat bottom portion and a generally cylindrically shaped continuous sidewall, the pot having a generally cylindrically shaped interior; and
   c) the frame including a plurality of struts that each include a plurality of strut portions, one of the strut portions extending upwardly along a generally vertical path, another of the strut portions extending horizontally to provide a horizontal surface that can cradle the bottom of the pot, another strut portion providing a downwardly extending leg;
   d) wherein the struts provide a lateral restraint structure for preventing tilting or lateral movement of the pot such as when the liner is inserted into or removed from the pot.

35. The cooking apparatus of claim 34 wherein the base includes a circular ring portion of the frame.

36. The cooking apparatus of claim 34 wherein the burner frame includes multiple rings and wherein the plurality of struts connects the upper and lower rings, and wherein each strut includes an inclined section.

37. The cooking apparatus of claim 34 wherein the burner frame includes an upper ring, a lower ring and a plurality of struts connecting the upper and lower rings, each strut including said first and second strut portions.

38. The cooking apparatus of claim 35 wherein the burner frame includes an upper ring, a lower ring and a plurality of struts connecting the said rings, each strut including said horizontal strut portion and said vertical strut portion.

39. The cooking apparatus of claim 34 wherein there are at least three circumferentially spaced apart struts.

40. The cooking apparatus of claim 34 further comprising a food holder that fits inside the pot interior, the food holder having a base the registers against the bottom of the pot and a vertically extending portion that enables a user to lift the food holder.

41. The cooking apparatus of claim 40 further comprising a horizontally extending portion that is connectable to the food holder and that is sufficiently wide that a user can grip the horizontally extended section with two hands.

42. The cooking apparatus of claim 34 wherein the horizontally extended section is between about seven and fourteen inches (7"–14") in length.

43. The cooking apparatus of claim 35 further comprising a multi-section smoker supported by the frame, the multi-section smoker including a lower smoker section having a recess that fits the strut portions of the frame.

44. A cooking apparatus, comprising:
   a) a frame having a base for engaging an underlying support surface;
   b) a burner element mounted on the frame for generating a high intensity flame for use in cooking;
   c) a supply hose for supplying pressurized fuel gas to the burner;
   d) the frame having a support surface for cradling a pot;
   e) the frame including a plurality of circumferentially spaced, radially extending struts, each strut having vertical and horizontal strut portions that are generally parallel to either the sidewall or the bottom of the pot during use, the horizontal strut portions positioned to cradle the bottom of the pot during use, the vertical strut portions positioned to prevent substantial lateral movement of the pot during use; and
   f) wherein the struts include integral members, each member having multiple bends including at least one bend that is between the vertical and the horizontal strut portions.

45. The cooking apparatus of claim 44 wherein the frame includes two rings, an upper ring and a lower ring and the struts are each structurally connected to the rings.

46. The apparatus of claim 44 wherein each strut includes an inclined section.

47. The apparatus of claim 44 wherein each strut has at least three bends.

48. The cooking apparatus of claim 44 wherein the frame includes an upper ring, a lower ring and a plurality of struts connecting the rings, each strut including a horizontal section, a vertical upper section and an inclined lower section.

49. The cooking apparatus of claim 44 wherein there are at least three radially extending horizontal sections spaced circumferentially apart for cradling the pot.

50. A cooking apparatus, comprising:
   a) a frame that includes a base for engaging an underlying support surface, the frame having a burner element for generating a high intensity flame for use in cooking, and a supply hose for supplying fuel to the cooking element;
   b) a pot that includes a generally flat bottom portion and a generally cylindrically shaped continuous sidewall, the pot having a generally cylindrically shaped interior;
   c) the burner frame including a plurality of struts that include first, second strut portions that closely conform respectively to the bottom portion and side wall of the pot, the second strut portion extending horizontally to provide a horizontal surface that can cradle the bottom of the pot and the first strut portion extending upwardly along a generally vertical path;
   d) wherein the struts form a lateral restraint to the pot for limiting lateral movement of the pot such as when the liner is inserted into or removed from the pot; and
   e) each strut including a leg portion that extends well below the burner element.

51. The cooking apparatus of claim 50 further comprising a multi-section smoker supported by the frame, the multi-section smoker including a lower smoker section having a recess that fits the strut portions of the frame.

52. The cooking apparatus of claim 50 wherein the frame includes a ground engaging member connected to the leg portions of the struts.

53. The cooking apparatus of claim 50 wherein the frame includes an upper ring, a lower ring and a plurality of struts connecting the upper and lower rings, each strut leg portion being an inclined section of the frame.

54. The cooking apparatus of claim 50 wherein the frame includes an upper ring, a lower ring and a plurality of struts connecting the upper and lower rings, each strut having at least three bends.

55. The cooking apparatus of claim 50 wherein the frame includes an upper ring, a lower ring and a plurality of struts connecting said rings, each strut including a horizontal strut portion and a vertical strut portion.

56. The cooking apparatus of claim 50 wherein there are at least three circumferentially spaced apart struts.

57. A cooking apparatus, comprising:
   a) a frame having a base for engaging an underlying support surface;
   b) a pot supported by the frame during use and having a side wall, a bottom and an open top;
   c) a burner element for generating a high intensity flame for use in cooking;
   d) a supply hose for supplying pressurized fuel gas to the burner;
   e) the burner frame including a plurality of struts, each strut including generally vertical and generally horizontal strut portions, each vertical strut portion extending upwardly along a generally vertical path that is generally parallel to the pot side wall and each horizontal strut portion extending horizontally to engage the pot bottom; and
   f) wherein each strut includes an inclined section.

58. The cooking apparatus of claim 57 wherein the burner frame includes an upper ring, a lower ring and the plurality of struts connect the rings.

59. The apparatus of claim 57 wherein each strut includes an inclined section.

60. The cooking apparatus of claim 57 wherein the frame includes an upper ring, a lower ring and a plurality of struts connecting the rings, each strut including a generally horizontal section and two generally vertical sections.

61. The cooking apparatus of claim 57 wherein the frame includes an upper ring, a lower ring and a plurality of struts connecting the rings, each strut including a horizontal section, an inclined section and a plurality of vertical sections.

62. The cooking apparatus of claim 57 wherein strut bends connect the horizontal section at its ends respectively to the pair of vertical sections.

63. The cooking apparatus of claim 57 further comprising a multi-section smoker supported by the frame, the multi-section smoker including a lower smoker section having a recess that fits the strut portions of the frame.

\* \* \* \* \*

UNITED STATES PATENT AND TRADEMARK OFFICE
CERTIFICATE OF CORRECTION

PATENT NO.   : 6,439,107 B1
DATED        : August 27, 2002
INVENTOR(S)  : Norman R. Bourgeois It is certified that error appears in the above-identified patent and that said Letters Patent is hereby corrected as shown below:

Column 9,
Line 2, should read as follows:

-- 1.   A cooking apparatus, comprising:

a) a burner having a frame that includes a base for engaging an underlying support surface, the frame having a burner element for generating a high intensity flame for use in cooking, a supply hose for supplying propane to the burner element, the burner frame having a support surface for cradling a pot;
b) a pot that includes a generally flat bottom portion and a generally cylindrically shaped continuous sidewall, the pot having a generally cylindrically shaped interior;
c) the frame including a plurality of at least three struts, each strut including a first strut portion, a second strut portion and a third strut portion, the first strut portion of each strut being generally parallel with the bottom portion of the pot, the second strut portion of each strut extending in a generally vertical direction from the first strut portion, the third strut portion extending downwardly from the first strut portion;
d) at least a portion of each of the first strut portions extending underneath the bottom portion of the pot when the pot is placed on the frame; and
e) the second strut portions restricting a range of lateral pot movement during use of the cooking apparatus such as when a food to be cooked is inserted into or removed from the pot. --

Column 13,
Line 16, should read as follows:

-- 50.   A cooking apparatus, comprising:

a) a frame that includes a base for engaging an underlying support surface, the frame having a burner element for generating a high intensity flame for use in cooking, and a supply hose for supplying fuel to the cooking element;
b) a pot that includes a generally flat bottom portion and a generally cylindrically shaped continuous sidewall, the pot having a generally cylindrically shaped interior;
c) the burner frame including a plurality of struts that include first, second strut portions that closely conform respectively to the bottom portion and side wall of the pot, the second strut portion extending horizontally to provide a horizontal surface that can cradle the bottom of the pot and the first strut portion extending upwardly along a generally vertical path;

UNITED STATES PATENT AND TRADEMARK OFFICE
CERTIFICATE OF CORRECTION

PATENT NO.    : 6,439,107 B1
DATED         : August 27, 2002
INVENTOR(S)   : Norman R. Bourgeois It is certified that error appears in the above-identified patent and that said Letters Patent is hereby corrected as shown below:

Column 13 cont'd,
     d) wherein the struts form a lateral restraint to the pot for limiting lateral movement of the pot such as when the liner is inserted into or removed from the pot; and
     e) each strut including a leg portion that extends well below the burner element. --

Column 14,
Line 9, should read as follows:

-- 57. A cooking apparatus, comprising:

a) a frame having a base for engaging an underlying surface;
     b) a pot supported by the frame during use and having a side wall, a bottom and an open top;
     c) a burner element for generating a high intensity flame for use in cooking;
     d) a supply hose for supplying pressurized fuel gas to the burner;
     e) the burner frame including a plurality of struts, each strut including generally vertical and generally horizontal strut portions, each vertical strut portion extending upwardly along a generally vertical path that is generally parallel to the pot side wall and each horizontal strut portion extending horizontally to engage the pot bottom; and
     f) wherein each strut includes an inclined section. --

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,439,107 B1
DATED         : August 27, 2002
INVENTOR(S)   : Norman R. Bourgeois It is certified that error appears in the above-identified patent and that said Letters Patent is hereby corrected as shown below:

Column 9,
Line 2, should read as follows:

-- 1.   A cooking apparatus, comprising:

a) a burner having a frame that includes a base for engaging an underlying support surface, the frame having a burner element for generating a high intensity flame for use in cooking, a supply hose for supplying propane to the burner element, the burner frame having a support surface for cradling a pot;
b) a pot that includes a generally flat bottom portion and a generally cylindrically shaped continuous sidewall, the pot having a generally cylindrically shaped interior;
c) the frame including a plurality of at least three struts, each strut including a first strut portion, a second strut portion and a third strut portion, the first strut portion of each strut being generally parallel with the bottom portion of the pot, the second strut portion of each strut extending in a generally vertical direction from the first strut portion, the third strut portion extending downwardly from the first strut portion;
d) at least a portion of each of the first strut portions extending underneath the bottom portion of the pot when the pot is placed on the frame; and
e) the second strut portions restricting a range of lateral pot movement during use of the cooking apparatus such as when a food to be cooked is inserted into or removed from the pot. --

Columns 11-12,
Claim 34 should read as follows:

-- 34. A cooking apparatus, comprising:

a) a burner having a frame that includes a base for engaging an underlying support surface, the frame having a burner element for generating a high intensity flame for use in cooking, the burner frame having a support surface for cradling a pot;
b) a pot that includes a generally flat bottom portion and a generally cylindrically shaped continuous sidewall, the pot having a generally cylindrically shaped interior; and
c) the frame including a plurality of struts that each include a plurality of strut portions, one of the strut portions extending upwardly along a generally vertical path, another of the strut portions extending horizontally to provide a horizontal surface that can cradle the bottom of the pot, another strut portion providing a downwardly extending leg;
d) wherein the struts provide a lateral restraint structure for preventing tilting or lateral movement of the pot such as when the liner is inserted into or removed from the pot. --

UNITED STATES PATENT AND TRADEMARK OFFICE
CERTIFICATE OF CORRECTION

PATENT NO.     : 6,439,107 B1
DATED          : August 27, 2002
INVENTOR(S)    : Norman R. Bourgeois It is certified that error appears in the above-identified patent and that said Letters Patent is hereby corrected as shown below:

<u>Column 13,</u>
Line 16, should read as follows:

-- 50.   A cooking apparatus, comprising:

a) a frame that includes a base for engaging an underlying support surface, the frame having a burner element for generating a high intensity flame for use in cooking, and a supply hose for supplying fuel to the cooking element;
    b) a pot that includes a generally flat bottom portion and a generally cylindrically shaped continuous sidewall, the pot having a generally cylindrically shaped interior;
    c) the burner frame including a plurality of struts that include first, second strut portions that closely conform respectively to the bottom portion and side wall of the pot, the second strut portion extending horizontally to provide a horizontal surface that can cradle the bottom of the pot and the first strut portion extending upwardly along a generally vertical path;
    d) wherein the struts form a lateral restraint to the pot for limiting lateral movement of the pot such as when the liner is inserted into or removed from the pot; and
    e) each strut including a leg portion that extends well below the burner element. --

UNITED STATES PATENT AND TRADEMARK OFFICE
CERTIFICATE OF CORRECTION

PATENT NO. : 6,439,107 B1
DATED : August 27, 2002
INVENTOR(S) : Norman R. Bourgeois It is certified that error appears in the above-identified patent and that said Letters Patent is hereby corrected as shown below:

<u>Column 14,</u>
Line 9, should read as follows:

-- 57.  A cooking apparatus, comprising:

a) a frame having a base for engaging an underlying surface;
    b) a pot supported by the frame during use and having a side wall, a bottom and an open top;
    c) a burner element for generating a high intensity flame for use in cooking;
    d) a supply hose for supplying pressurized fuel gas to the burner;
    e) the burner frame including a plurality of struts, each strut including generally vertical and generally horizontal strut portions, each vertical strut portion extending upwardly along a generally vertical path that is generally parallel to the pot side wall and each horizontal strut portion extending horizontally to engage the pot bottom; and
    f) wherein each strut includes an inclined section. --

This certificate supersedes Certificate of Correction issued December 24, 2002

Signed and Sealed this

Sixth Day of May, 2003

JAMES E. ROGAN
*Director of the United States Patent and Trademark Office*